May 17, 1960 V. E. WHITMAN 2,936,690
PHOTOGRAPHIC CAMERA
Filed Feb. 24, 1956

INVENTOR.
VERNON E. WHITMAN
BY
ATTORNEY

United States Patent Office 2,936,690
Patented May 17, 1960

2,936,690
PHOTOGRAPHIC CAMERA

Vernon E. Whitman, Rochester, N.Y., assignor to Graflex, Inc., Rochester, N.Y., a corporation of Delaware Application February 24, 1956, Serial No. 567,524

6 Claims. (Cl. 95—64)

The present invention relates to photographic cameras, and more particularly to photographic cameras of the so-called "miniature" type for taking small size pictures suitable for making color slides. In a more specific aspect, the invention relates to means for aiding a photographer to adjust quickly and with satisfactory precision the diaphragm opening of a "miniature" camera, particularly when using a synchronized flash lamp as the chief source of illumination in making an exposure. The present invention constitutes an improvement on the invention disclosed in my pending patent application Serial No. 492,349, filed March 7, 1955, and now abandoned.

One of the chief appeals of the so-called "miniature" cameras lies in their speed and unobtrusive manner with which they may be operated. One of their prime uses is in taking snapshots. These cameras should, therefore, have a means for quickly setting the diaphragm or lens aperture.

"Miniature" cameras are widely used for taking colored pictures for color slides and indoors with flash lamps. The diaphragm setting is critical in color photography. If the aperture opening is too far from optimum, the colors recorded in the resulting photograph will be unacceptable. Where color pictures have to be taken indoors under artificial light conditions, correct setting of the diaphragm or lens aperture is especially important; but if there is any uncertainty or delay in being able to select and set the lens aperture, the desired picture is liable to be lost.

Because of a well-known characteristic of all photographic emulsions, known as their "latitude," a calculation must normally be made before the photographer is ready to set his lens aperture with sufficient accuracy to insure acceptable quality in the photographic end results. This is particularly true with color films because of their relatively low "latitude."

The correct diaphragm setting, or lens aperture, is dependent not only on the focusing distance, but also on a variety of other factors such as the emulsion (film) used, the make and size of the flash lamp, the size and finish of the reflector, the shutter speed, etc. Because of the need for using "miniature" cameras under conditions requiring speed and simplicity, the above-mentioned calculation is usually resolved to the mathematical operation of dividing the distance from the flash lamp to the subject into a fixed guide number which combines all of the other factors.

The exact relationship between lens aperture A, focusing distance D, and guide number $G_n$ is:

$$A = \frac{G_n}{D} \quad (1)$$

see "American Standard Method for Determining Exposure Guide Numbers for Photographic Lamps"—PH. 2.4—1953.

It is fortunate, thanks to the latitude of the photosensitive materials used, that an extremely accurate calculation of lens aperture based on the above formula is not necessary for the average photographer. This would be time-consuming and discouraging. Because the synchronized light sources are usually attached to the cameras themselves, the distance involved in this calculation may be taken as that from the camera to the subject as conveniently determined by means of a rangefinder and its associated distance scale.

One object of the present invention is to provide means for simplifying the procedure of determining and setting the required lens aperture or diaphragm opening on a camera, and particularly on a camera of the so-called "miniature" type, regardless of the guide number.

Another object of the invention is to provide a means which will enable the proper diaphragm opening or lens aperture adjustment to be determined and made under varying conditions as to film, and flash bulb as a result of having focused the camera on the object of principal interest to be photographed.

Another object of the invention is to provide an adjustable diaphragm setting scale for setting the diaphragm opening, whose position is determined by the guide number, and which is coordinated with the focusing scale of the camera.

Other objects of the invention will be apparent hereinafter from the specification and from the recital of the appended claims.

The invention has been illustrated in connection with a camera of the type disclosed in the U.S. patent application of Louis M. Traino et al., Serial No. 371,053, filed July 29, 1953, and now Patent No. 2,860,560; but is not confined to use on such a camera.

Figure 1:
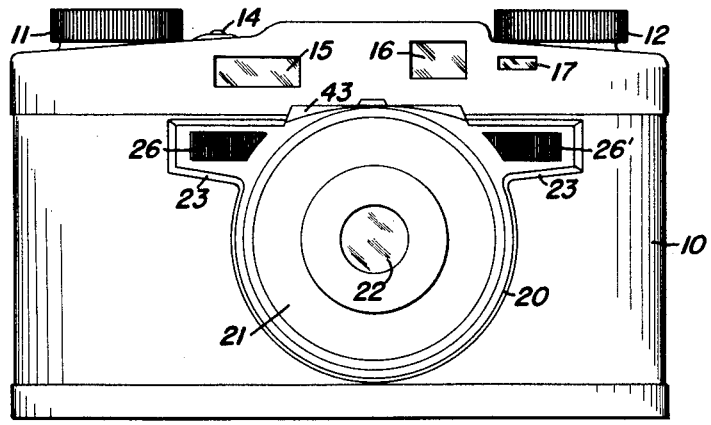
Fig. 1 is a front elevation of one form of camera which may advantageously be equipped with a diaphragm setting scale made according to the present invention.
Figure 2:
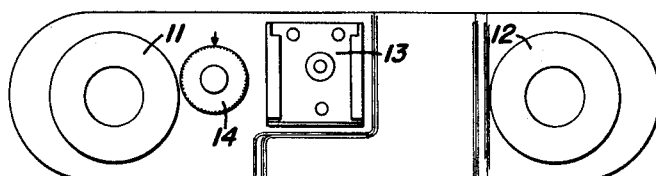
Fig. 2 is a top plan view of this camera, showing both the diaphragm setting scale and the coordinated focusing distance scale.
Figure 3:
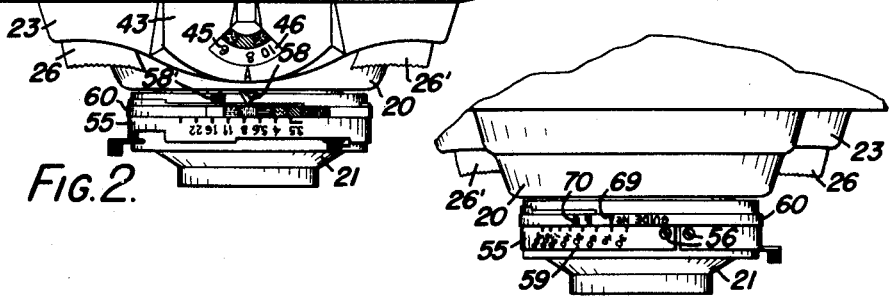
Fig. 3 is a bottom plan view showing particularly the guide number adjustment ring and the scale which cooperates therewith.

Referring now to the drawing by numerals of reference, 10 denotes the camera casing, which houses the film supply and take-up spools, and which may house a suitable range finder. Conventional knurled knobs 11 and 12 are provided on the camera for rotating the spools to advance and rewind the film. A shoe 13 (Fig. 2) is provided on top of the camera casing for the electrical and/or mechanical coupling of a synchronized flash unit; and an exposure counter may also be provided as denoted at 14. Windows 15 and 17 are provided in front of the camera through which two different images of the subject are produced in the rangefinder system. 16 is a window in front of the camera through which the subject may be viewed when a picture is being taken.

The focusing mechanism of the camera is supported in a body or housing 20 which protrudes forwardly from the casing 10. Slidably mounted in this body or housing 20 is a barrel or tube 21 which carries the objective lens 22 of the camera, and the camera shutter.

The body portion 20 forward of the casing 10, is round about the major portion of its periphery but is formed at opposite sides at its top with winged portions 23. The means for effecting axial movement of barrel or tube 21 to focus the camera may be of conventional form, or may comprise a double-arm lever, such as fully disclosed in the Traino et al. application mentioned above. This lever has enlarged portions 26, 26' at opposite ends which have knurled front faces. The lever is pivotally mounted intermediate its ends upon a pivot pin (not shown) that is threaded into the body or housing 20, and that has a protruding portion (not shown) which engages in a slot or groove (not shown) that extends axially of the tube 21 to hold the tube 21 against rotation and constrain it to travel axially. Threaded into the tube 21 at one side of the described pivot pin, as illustrated fully in the Traino et al. application mentioned above, is a driving pin (not shown) which extends through a slot (not shown) in the body 20 and which engages in an elongate slot (not shown) in the focus-adjusting lever. The enlarged knurled end portions 26, 26' of this lever constitute finger rests on which the photographer puts a finger of each hand as he grasps the camera casing at both sides and sights the camera on the subject to be photographed. When one end 26, or the other end 26', of this lever is pressed, the lever will move in one direction or the other about its pivot, thereby actuating the driving pin and imparting axial movement to the tube 21 in one direction or the other, depending upon whether the photograher applies pressure to the end 26 or to the end 26' of the lever.

This focus-adjusting lever through gearing, such as disclosed in the Traino et al. application mentioned, drives an indicator dial 45 (Figs. 2 and 6), which is graduated to designate conventional focusing distances from say three feet to infinity. This dial is visible through an aperture or window 46 provided in a cover 43 which is fastened by screws (not shown) to the body 20 to enclose the space within which the lever is mounted. The graduations of this dial may be read against an arrow on cover 43 shown in Fig. 2.

The diaphragm of the camera may be of conventional construction, save that it must be of the so-called "straight-line" type, that is, the diaphragm must be of the type that for equal linear displacements of the diaphragm-setting pointer against the diaphragm setting scale there will result equal percentage changes in light transmission as controlled by the diaphragm aperture. In the camera of the present invention two separate scales are provided for setting the diaphragm opening. One of these scales is fixed, and is used when taking pictures outdoors or under natural lighting conditions. The other scale is used when taking color pictures with artificial light.

Figure 4:
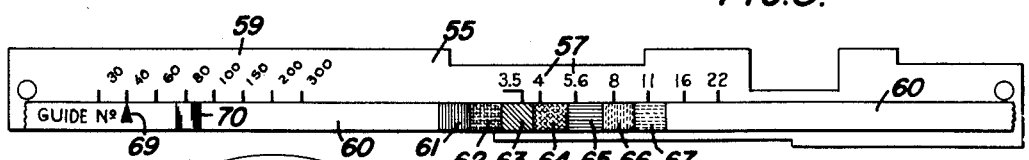
Fig. 4 is a developed view of the diaphragm scale of the camera, and of the guide number setting ring.

The fixed diaphragm setting scale is denoted at 55, and is shown on a large scale in Fig. 4. This scale is wrapped, as a band, around the periphery of the objective lens mount 21 and is secured thereto by screws 56, or in any suitable manner. This diaphragm scale is graduated with the usual graduations as, for instance, "3.5" to "22" denoting the different lens apertures. A conventional pointer 58 (Fig. 2), which is secured to the diaphragm mechanism of the camera and which reads against the scale 57, is used to adjust the diaphragm opening or lens aperture. A conventional knurled lug 58' is provided for moving the pointer 58.

Because this scale is intended for use with a diaphragm of the straight line type, the distances between successive graduations 4, 5.6, 8, 11, 16 and 22 of the scale are essentially equal to one another. Moreover, when the pointer 58, which reads against this scale, is moved from registry with the graduation "4" of this scale to registry with the graduation "5.6," the same diminution of light intensity (50%) will result as will be experienced when said pointer is moved from one to another of the other successive graduations "8," "11," "16" and "22."

Opposite the graduations 57 on the band 55 are equi-anguarly spaced graduations 59 denoting guide numbers.

The other diaphragm setting scale is an adjustable ring or band 60 which is mounted for rotatable adjustment in relation to the band 55. Ring or band 60 has a plurality of colored blocks of equal angular length around part of its periphery, denoted, respectively, at 61, 62, 63, 64, 65, 66, and 67. Approximately diametrically opposite the colored blocks, the band 60 carries an arrow 69 which is intended to read against the guide number graduations 59 on the band 55. The ring or band 60 is movable by gripping the loop portion 70 which is formed therein. This loop portion also serves to give the ring resilient, frictional, gripping engagement with the part on which it is mounted, the barrel of the lens mount, for instance, so as to hold the ring 60 in any adjusted position.

The latitude of the emulsion is conventionally expressed on the diaphragm setting scale in fractions of a stop, such as one half stops in the case of the color films normally used. This means that the photographer is allowed a certain error (one-half stop) in setting his lens aperture as compared with the theoretically correct exposure. The difference between "stops" in conventional lens marking (the "American Standard Lens Aperture Markings"—Z38.4.7—1950) may be defined as an exposure ratio of two to one. In other words two adjacent diaphragms stops, such as "4" and "5.6" (Fig. 4), in accordance with this American Standard, are so related that the aperture "4" passes twice the light through the lens (gives twice the exposure) as the aperture "5.6." The above statement that a given film, such as modern 35 mm. color film, has a latitude of one-half stop, means that a scene, whose theoretically correct exposure calls for a lens aperture of "5.6," for instance, will record to the entire satisfaction of the average photographer if the aperture control on the camera is anywhere along the scale between "5.6" ideal, and the point in the direction of "4" on said scale at which 50% more light would be admitted (the setting "4" admits 100% more light than the setting of "5.6").

When a diaphragm is employed in the camera that has equi-angularly spaced stops, the half-stop positions can be assumed as equi-spaced between successive graduations. This enables use of an auxiliary, quick-setting diaphragm scale such as provided on band 60 (Fig. 4). Here stop ranges are provided in the form of identifiable zones, differently colored and of equal angular length. These ranges are blocks 61, 62, 63, 64, 65, 66 and 67 colored red, yellow, green, orange, blue, purple, and grey, respectively. These ranges are equivalent to the distances between two successive dipahragm stops of the fixed setting scale 57. Thus, when the band 60 is adjusted to the guide number of the emulsion (film) used in the camera by setting arrow 69 against the proper guide number graduation on scale 59, the color ranges 61, 62, 63, 64, 65, 66, 67 can be used for quickly setting the required diaphragm opening or lens aperture as will be hereinafter further described.

Figure 6:
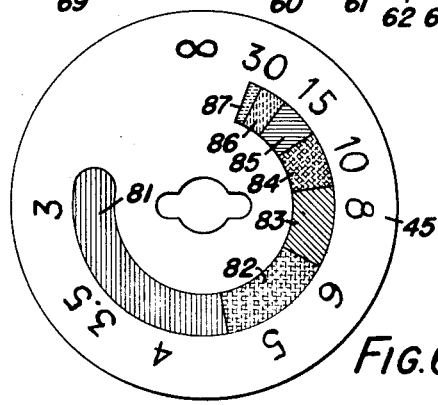
Fig. 6 is a view on an enlarged scale showing the focusing scale or dial of the camera.
Figure 5:
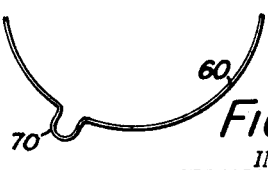
Fig. 5 is a fragmentary end view of this guide number setting ring.

The entire theory on which the use of guide numbers is based assumes a light source (reflector and flash bulb on the camera, for instance) from which the intensity of illumination falling on the subject varies as the square of the distance between the light source and the subject. Within a very acceptable tolerance, this is the case with the reflectors and flash bulbs used in photography. Advantage is taken of this fact to mark the distance scale 45 with colored zones whose borders are related to one another in terms of distance units of said scale, as the square root of two. As far as colors are concerned, the differently colored zones of the dial 45 have to have a sequential relation with those on movable band 60. That is, the colors of the differently colored blocks 81, 82, 83, 84, 85, 86, 87, must be in the same sequence as the colors of color blocks 61, 62, 63, 64, 65, 66 and 67 of setting ring 60. Color block 81 is red, color block 82 is yellow, color block 83 is green, color block 84 is orange, color block 85 is blue, color block 86 is purple, and color block 87 is grey. Furthermore, in coding the dial 45, as shown in Fig. 6, its colored zones must be related to one another in terms of distance units of this dial. This means, for example, that if the border between colors 81 and 82 of Fig. 6 corresponds to 4.6 feet, then the border between colors 82 and 83 will be at the square root of two, times 4.6 feet, or approximately at 6.5 feet. The next border in the same progression will be at 6.5 feet times the square root of two, or at approximately 9.2 feet. It should be pointed out, however, that the starting point of such a color scaling is purely arbitrary, and need only be chosen with an eye to convenience in placement of the guide number scale 59 and its cooperating arrow 69.

If the distance scale is coded as illustrated in Fig. 6, it is only necessary to note the position of the distance pointer or fiducial mark, against said coding, after focusing with the range finder, and to set the lens aperture pointer 58 in relatively the same coded position against the color scale on band 60, after adjustment of that band to the proper guide number. Anyone, who follows the recommended procedure of placing the lens aperture control in essentially the same position as that of the fiducial mark against the distance scale, will come very close to the correct exposure. Even if he matches code for code only and completely disregards within what part of a code area either pointer falls, he would still be within one full stop of the correct exposure, probably much closer. Even this one stop tolerance is within the latitude of many highly useful films.

While the invention thus has been described in connection with the coding system allowing one full stop maximum exposure error, it would be possible obviously to set the system for one-half stop maximum error, in which case one quarter stop latitude would be allowed on each of the aperture and distance scales. In fact, the stop latitude could be further reduced, making the color blocks or graduations still smaller and smaller, and even a continuous spectrum might be used for both diaphragm and focus scales.

It will be seen, therefore, that with the system of the present invention, the proper exposure opening can easily and quickly be set for a given focal distance setting. The photographer has the option of using the conventional, precise diaphragm setting scale 57, or of using the coded color scale 60 in conjunction with the coded color scale 45. It is to be noted that in the camera shown, the scale 60, the scale 55, and the dial 45 are all visible from above, so that as the photographer sights his camera, and focuses it, he can easily and quickly glance at the colored block on dial 45, at which the dial stops when the camera is focused, and set the diaphragm setting pointer 58 to the same color block on the ring 60, thereby knowing that his lens aperture is correct within satisfactory photographic limits.

While the stops identification is shown in Fig. 4 by means of color, it can be secured by shading, surface texture, rulings, etc.

While the invention has been described in connection with a particular embodiment thereof, then, it will be understood that it is capable of further modification; and this application is intended to cover any variations, uses, or adaptations of the invention, following, in general, the principles of the invention and including such departures from the present disclosure as come within known or customary practice in the art to which the invention pertains, and as may be applied to the essential features hereinbefore set forth, and as fall within the scope of the invention or the limits of the appended claims.

Having thus described my invention, what I claim is:

1. A photographic camera having an objective lens mount, and in which the lens mount and the film plane are adjustable relative to one another for focusing, an adjustable diaphragm in said lens mount to control the lens aperture, a scale on said lens mount arranged about the axis of said lens mount, a movable index pointer readable against said scale to set the diaphragm opening and connected to said diaphragm to vary the opening of the diaphragm on movement of said pointer, and a distance scale for indicating the focusing adjustment of the camera, each of said scales comprising a plurality of separate but contiguous indicia areas, each of said areas being of substantial angular width and each bearing indicia different from the indicia borne by other areas of the same scale, the different indicia areas on one of said scales being all of the same angular width, the arrangement of the different indicia areas on one scale corresponding to and being in the same sequence as the arrangement of the different indicia areas on the other scale whereby the diaphragm opening may be set by adjusting the index pointer to an indicia area on the diaphragm scale which corresponds to that indicia area on the distance scale which indicates the focused position, said diaphragm setting scale being adjustable on said lens mount about the axis of the objective lens to set said diaphragm setting scale initially in accordance with a selected, standard exposure indicating index.

2. A photographic camera having an objective lens mount, and in which the lens mount and the film plane are adjustable relative to one another for focusing, an adjustable diaphragm in said lens mount to control the lens aperture, a scale fixed to said lens mount and having two sets of indicia thereon, one of which comprises angularly-spaced graduations for setting the diaphragm opening, and the second of which is for use in setting an exposure correlating index, a second scale mounted on said lens mount for adjustment thereon about the axis of the objective lens, said second scale having two sets of indicia around its periphery, one of which comprises a plurality of separate indicating areas for use in setting the diaphragm opening, and the other of which is a mark readable against the second indicia of the first-named scale for use in setting said exposure correlating index, each of said indicating areas being of substantial angular width and each bearing a different indication from the others, a pointer readable against both the diaphragm setting graduations of said first-named scale and the separate indicating areas of said second scale, said pointer being movable angularly about the axis of the objective lens and being connected to said diaphragm to vary the opening of the diaphragm on movement of said pointer, and a rotatable distance scale for indicating the focusing adjustment of the camera, said distance scale having a plurality of separate indicating areas thereon which are also of substantial angular width and which are arranged in the same sequence as the separate indicating areas on said second scale, whereby the diaphragm opening may be set by adjusting said pointer to an indicating area on said second scale which corresponds to that indicating area on the distance scale which indicates the focused position.

3. A photographic camera having an objective lens mount, and in which the lens mount and the film plane are adjustable relative to one another for focusing, an adjustable diaphragm in said lens mount to control the lens aperture, a scale fixed to said lens mount and having two sets of indicia thereon, one of which comprises angularly-spaced graduations for setting the diaphragm opening and the second of which is for use in setting an exposure correlating index, a second scale mounted on said lens mount for adjustment thereon about the axis of the objective lens, said second scale having two sets of indicia around its periphery, one of which comprises a plurality of separate indicating areas for use in setting the diaphragm opening and the other of which is a mark readable against the second indicia of the first-named scale for use in setting said exposure correlating index, each of said indicating areas being of substantial angular width and each bearing a different indication from the other areas, a pointer readable against both the diaphragm setting graduations of said first-named scale and the indicating areas of said second scale, said pointer being movable angularly about the axis of the objective lens and being connected to said diaphragm to vary the opening of the diaphragm on movement of said pointer, and a rotatable distance scale for indicating the focusing adjustment of the camera, said distance scale having a plurality of separate indicating areas thereon which are also of substantial angular width and which are arranged in the same sequence as the indicating areas on said second scale, whereby the diaphragm opening may be set by adjusting said pointer to an indicating area on said second scale which corresponds to that indicating area on the distance scale which indicates the focused position, said second scale being in the form of a resilient ring which is rotatable relative to said first-named scale and which is held in any adjusted position on the first-named scale by its own inherent resilience.

4. A photographic camera having an objective lens mount, and in which the lens mount and the film plane are adjustable relative to one another for focusing, an adjustable diaphragm in said lens mount to control the lens aperture, a scale fixed to said lens mount and having two sets of indicia thereon, one of which comprises angularly-spaced graduations for setting the diaphragm opening and the second of which is for use in setting an exposure correlating index, a second scale mounted on said lens mount for adjustment thereon about the axis of the objective lens, said second scale having two sets of indicia around its periphery, one of which comprises a plurality of separate indicating areas for use in setting the diaphragm opening and the other of which is a mark readable against the second indicia of the first-named scale for setting said exposure correlating index, each of said indicating areas being of substantial angular width and each bearing a different indication from the other areas, a pointer readable against both the diaphragm setting graduations of said first-named scale and the indicating areas of said second scale, said pointer being movable angularly about the axis of the objective lens and being connected to said diaphragm to vary the opening of the diaphragm on movement of said pointer, and a rotatable distance scale for indicating the focusing adjustment of the camera, said distance scale having a plurality of separate indicating areas thereon which are also of substantial angular width and which are arranged in the same sequence as the indicating areas on said second scale, whereby the diaphragm opening may be set by adjusting said pointer to an indicating area on said second scale which corresponds to that indicating area on the distance scale which indicates the focused position, said second scale being in the form of a ring which has a loop formed therein to make it resilient, said ring being rotatably adjustable on said first-named scale and being held in any adjusted position on said first-named scale by its own inherent resilience, said loop serving as a handle for moving said ring on said first-named scale.

5. A photographic camera having an adjustable lens mount, and in which the lens mount and the film plane are adjustable relative to one another for focusing, an adjustable diaphragm in said lens mount to control the lens aperture, a scale for setting said diaphragm, and a distance scale for indicating the focusing adjustment of the camera, the diaphragm scale having a plurality of linearly-arranged colored areas thereon corresponding, respectively, to different openings of the diaphragm, the different areas being of approximately equal angular extent but differently colored, said distance scale having a plurality of differently-colored areas thereon which are of different angular extent, respectively, and which correspond, respectively, to different distances to which the objective lens is focused, the differently-colored areas of the diaphragm scale being arranged in the same sequence as the differently-colored areas of the distance scale so that when the diaphragm scale is set for a colored area corresponding to the colored area reading on the distance scale, a satisfactory diaphragm opening for that focusing distance is attained.

6. A photographic camera having an objective lens mount, and in which the lens mount and the film plane are adjustable relative to one another for focusing, an adjustable diaphragm in said lens mount to control the lens aperture, a scale fixed to said lens mount and having two sets of indicia thereon, one of which comprises angularly-spaced graduations for setting the diaphragm opening, and the second of which is for use in setting an exposure correlating index, a second scale mounted on said lens mount for angular adjustment thereon about the axis of the objective lens, said second scale having two sets of indicia around its periphery, one of which comprises a plurality of separate indicating areas for use in setting the diaphragm opening, and the other of which is a mark readable against the second indicia of the first-named scale for use in setting said exposure correlating index, the different indicating areas of the second scale being of approximately equal angular extent and differently colored one from another, a pointer readable against both the diaphragm setting graduations of said first-named scale and the separate indicating areas of said second scale, said pointer being movable angularly about the axis of the objective lens and being connected to said diaphragm to vary the opening of the diaphragm on movement of said pointer, and a rotatable distance scale for indicating the focusing adjustment of the camera, said distance scale having a plurality of differently-colored areas thereon corresponding, respectively, to different distances to which the objective lens is focused, the differently colored areas of said distance scale being arranged in the same sequence as the differently colored areas of the second diaphragm scale so that when the diaphragm scale is set for a colored area corresponding to the colored area reading on the distance scale, a satisfactory diaphragm opening for that focusing distance is attained.

References Cited in the file of this patent

UNITED STATES PATENTS

| | | |
|---|---|---|
| 1,788,655 | Beach | Jan. 13, 1931 |
| 2,213,749 | Strauss | Sept. 3, 1940 |
| 2,343,257 | Hineline | Mar. 7, 1944 |
| 2,464,559 | Davenport et al. | Mar. 15, 1949 |

FOREIGN PATENTS

| | | |
|---|---|---|
| 1,014,063 | France | May 21, 1952 |
| 1,083,260 | France | June 23, 1954 |